(12) United States Patent
Huybrechts et al.

(10) Patent No.: US 6,245,274 B1
(45) Date of Patent: *Jun. 12, 2001

(54) METHOD FOR MAKING ADVANCED GRID-STIFFENED STRUCTURES

(75) Inventors: Steven M. Huybrechts, Sandia Park, NM (US); Troy E. Meink, Troy, IL (US); Richard L. Underwood, Jr., Albuquerque, NM (US)

(73) Assignee: The United States of America as represented by the Secretary of the Air Force, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,305

(22) Filed: Mar. 2, 1998

(51) Int. Cl.$^7$ ............................................... B29C 70/44
(52) U.S. Cl. ..................... 264/257; 264/313; 156/173; 425/DIG. 14
(58) Field of Search .................... 264/257, 313, 264/319; 425/DIG. 14, DIG. 112, 417; 158/173

(56) References Cited

U.S. PATENT DOCUMENTS

| | | | |
|---|---|---|---|
| 1,575,472 | * 3/1926 | Weitzel | 264/257 |
| 2,010,827 | * 8/1935 | Ray | 264/257 |
| 2,442,516 | * 6/1948 | Shriver | 425/DIG. 14 |
| 3,290,421 | * 12/1966 | Miller, Jr. | 264/219 |
| 3,309,449 | * 3/1967 | Jansen et al. | 264/257 |
| 3,855,029 | * 12/1974 | Sabel | 264/257 |
| 3,962,393 | * 6/1976 | Blad | 264/313 |
| 4,012,549 | * 3/1977 | Slysh | 428/116 |
| 4,062,917 | * 12/1977 | Hill et al. | 264/313 |
| 4,086,378 | * 4/1978 | Kam et al. | 428/36 |
| 4,137,354 | * 1/1979 | Mayes, Jr. et al. | 428/116 |
| 4,167,430 | * 9/1979 | Arachi | 264/313 |
| 4,380,013 | * 4/1983 | Slysh | 343/753 |
| 4,380,483 | * 4/1983 | Kliger | 264/257 |
| 4,388,263 | * 6/1983 | Prunty | 264/257 |
| 4,702,870 | * 10/1987 | Setterholm et al. | 264/313 |
| 5,059,377 | * 10/1991 | Ashton et al. | 264/257 |
| 5,200,251 | * 4/1993 | Brand | 428/156 |
| 5,204,042 | * 4/1993 | James et al. | 264/313 |
| 5,277,854 | * 1/1994 | Hunt | 264/313 |
| 5,292,475 | * 3/1994 | Mead et al. | 264/257 |
| 5,599,565 | * 2/1997 | Dittlo | 425/DIG. 14 |
| 5,632,940 | * 5/1997 | Whatley | 264/257 |
| 5,817,269 | * 10/1998 | Younie et al. | 264/313 |
| 5,888,608 | * 3/1999 | Tsai | 428/105 |
| 6,007,894 | * 12/1999 | Barnes et al. | 428/420 |
| 6,073,670 | * 6/2000 | Koury | 156/425 |

* cited by examiner

*Primary Examiner*—Jan H. Silbaugh
*Assistant Examiner*—Stefan Staicovici
(74) *Attorney, Agent, or Firm*—Thomas C. Stover

(57) ABSTRACT

A method for making grid-stiffened structures as provided. The method includes providing a base tool having a plurality of grooves and an expansion tool having a plurality of compaction grooves therein for fitting into a plurality of the base tool grooves so as to define compaction grooves therein. A plurality of prepreg tows are then wound into the compaction grooves. A skin is then placed over the so-wound tows, the expansion tool and the base tool to define an assembly. The assembly is then bagged and autoclaved so that the expansion tool expands to provide lateral pressure to compact the prepreg tows in the compaction grooves to shape same into ribs to form a rib-stiffened structure. An analytical thermal model is developed to predict the behavior of the expansion tool.

8 Claims, 5 Drawing Sheets

METHOD FOR MAKING ADVANCED GRID-STIFFENED STRUCTURES

STATEMENT OF GOVERNMENT INTEREST

The invention described herein may be manufactured and used by or for the Government for governmental purposes without the payment of any royalty thereon.

BACKGROUND OF THE INVENTION

This application is related to a provisional patent application filed Jun. 27, 1997.

The present invention relates to composite parts, and, in particular, relates to a process of making advanced grid stiffened structures.

Although it is widely accepted that composite materials will be used extensively in the next generation of launch vehicles, the specific structural type has yet to be determined. One possible structural type is the Advanced Grid Stiffened (AGS) structure, a skin-stringer configuration evolved from early isogrid stiffening concepts. AGS structures have recently gained popularity as a possible solution to many of the problems associated with traditional composite construction methods involving lamination of plates and sandwich type structures. AGS structures are characterized by a lattice of rigid, interconnected ribs, which proves to be an inherently strong and resilient arrangement for composite materials and lacks the material mismatch associated with laminated structures. AGS structures possess inherent resistance to impact damage, delamination and crack propagation while showing a high potential for automation during fabrication.

All AGS structures suffer from the same manufacturing difficulty: for an AGS structure to have all fibers continuous through a rib crossing point, there must be twice as much material in each crossing point than in each rib, making out-of-plane compaction difficult or impossible. For most manufacturing methods, this difficulty leads to a buildup at the nodal points, which is undesirable for many reasons. Known manufacturing methods for AGS structures are: Node Compaction: Brute force compaction through out-of-plane pressure using hard tooling; Fiber Cutting: Allowing only 50% of the fibers to pass through each node; Low Rib Fiber Volume: Having resin-rich ribs with 50% the fiber volume of the nodes; Lateral Compaction: Consolidating ribs from the sides, effectively causing the extra material at the node to lead to double node width rather than double node height; and Nodal Spreading: Spreading of fibers as they enter the node allowing out-of-plane pressure to lead to double node width rather than double node height. Of these methods, Nodal Spreading and Lateral Compaction are the only methods to experience high quality results; of these two, Lateral Compaction is the most cost effective. Lateral Compaction is typically performed with a silicon rubber tool that expands during the cure cycle, laterally compacting the AGS ribs. Unfortunately, this approach suffers from several drawbacks, including poor part geometry control, poor part stability, inability to manufacture large parts, inability to manufacture complex shapes and labor intensive processing.

Thus, there exists a need for a new technique to make AGS.

SUMMARY OF THE INVENTION

The hybrid tooling process implementation uses a high CTE silicon rubber expansion tooling channel insert into a thermally stable base tooling material, which may be composed of tooling epoxy, tooling foam, wood or metallics. While the base tool defines the part dimensions, the silicon rubber expansion tooling expands during the thermal cure cycle to provide rib compaction. This expansion tooling takes the form of a 'U' shaped channel section, centered on a node, with arms in each of the rib directions. The channel's cross-section dimensions must be carefully sized using developed theories. During tool manufacture, the channels are cast flat and laid into grooves machined in the base tool for both flat and curved parts. For cylindrical or flat sections, one channel size is sufficient. For conical sections, the channels must be cut to size.

The hybrid tooling process solves many of the problems associated with Lateral Compaction while providing a number of additional advantages. Hybrid tooling process offers an AGS structure manufacturing solution that is low cost, is highly automated, provides for good part compaction and provides for good geometry control. Using the hybrid tooling process and standard filament winding technology, AGS tooling can be created, machined and wound in a series of seamless, automated steps. Also, the resulting tooling is, in most cases, reusable.

The ideal Lateral Compaction tool combines high coefficient of thermal expansion (CTE), good predictability of thermal behavior, high tool stability, a light weight design, machinability and good part release. The hybrid tooling process approach recognizes the inability of any existing tooling material to provide all these attributes.

Therefore, the hybrid tooling process uses two different tooling materials for the two devices: one is a base tool and one is an expansion tool. These tools combined provide the advantages and mitigate the disadvantages of each material.

Therefore, one object of the present invention is to provide a hybrid tooling process for making advanced grid stiffened structures.

Another object of the present invention is to provide a hybrid tooling process having high CTE;

Another object of the present invention is to provide a hybrid tooling process having good predictability of thermal behavior;

Another object of the present invention is to provide a hybrid tooling process having high tool stability;

Another object of the present invention is to provide a hybrid tooling process having a light weight design;

Another object of the present invention is to provide a hybrid tooling process having high machinability;

Another object of the present invention is to provide a hybrid tooling process having good part release; and Another object of the present invention is to provide a hybrid tooling process for making panels, sandwich cores and/or expansive networks of composite materials.

These and many other objects and advantages of the present invention will be ready apparent to one skilled in the pertinent art from the following detailed description of a preferred embodiment of the invention and the related drawings.

DESCRIPTION OF THE PREFERRED EMBODIMENT

Figure 1:
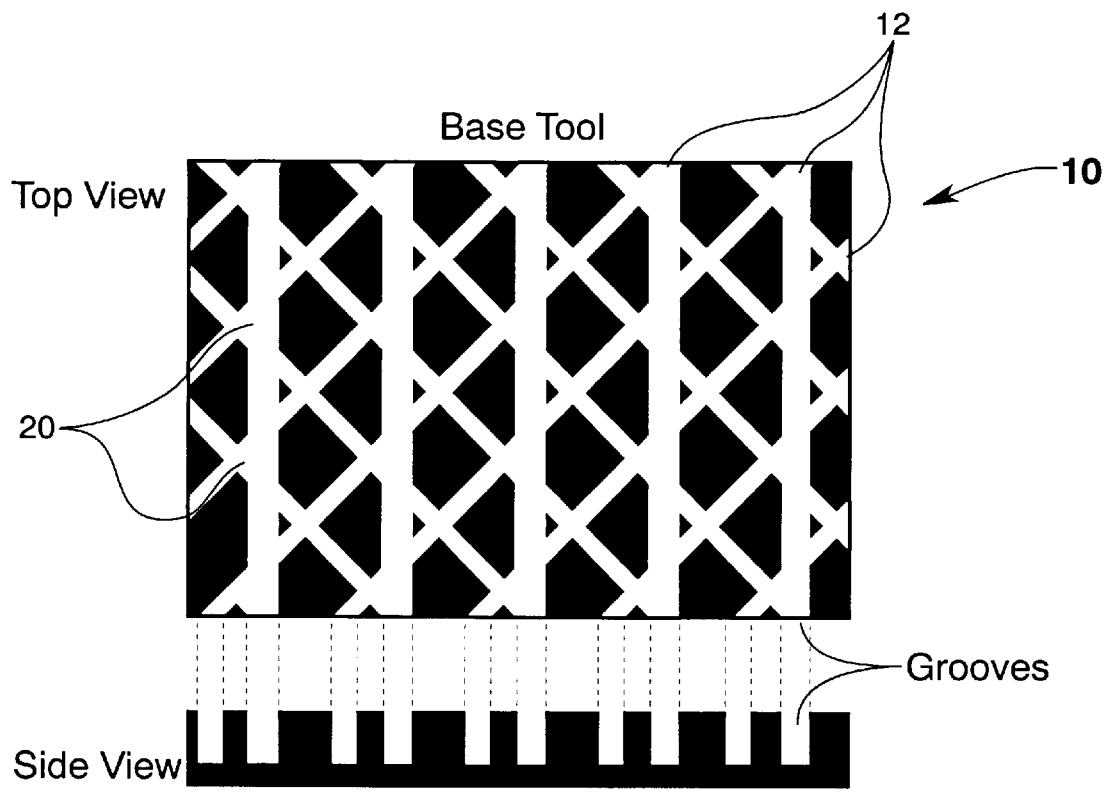
FIG. 1 is a schematic of a possible base tool of the present invention.
Figure 2:
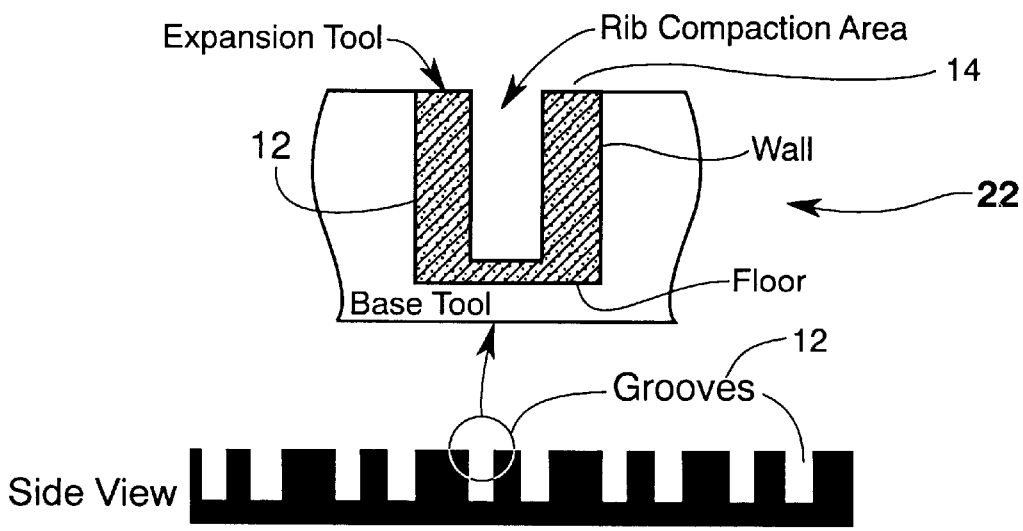
FIG. 2 is a schematic of a possible expansion tool of the present invention.

Typically, a base tool 10 as partially seen in FIG. 1 is machined including grooves 12 for the expansion tool 14 as partially seen in FIG. 2 which is separately cast. The expansion tool 14 is laid into the grooves 12 at the nodes 20 where the grooves cross and have arms extending into the grooves 12. Prepreg tows, not shown, are wound into this combined tool 22, only partially shown in FIG. 2. The skin, not shown, is wound over the base tool 10 and the entire part, forming an assembly of the skin, so-wound tows, expansion tool and base tool, is then bagged and autoclaved. The machining of the base tool 10, the winding of the ribs and the winding of the skin can be accomplished in a fully automated manner. Both tooling sections are typically reusable.

Figure 7:
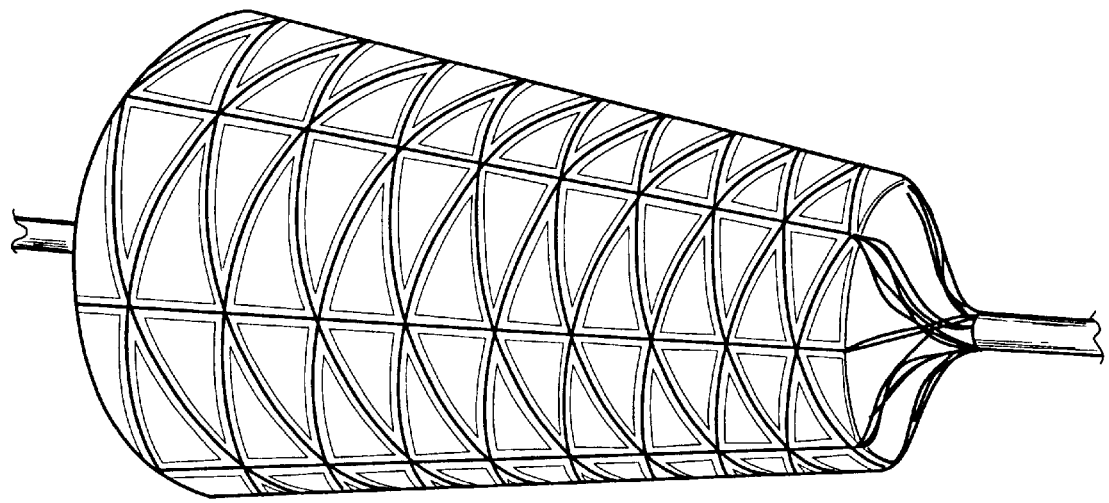
FIGS. 7 and 8 illustrate a hybrid tooling device for making a single piece shroud and the shroud.
Figure 8:
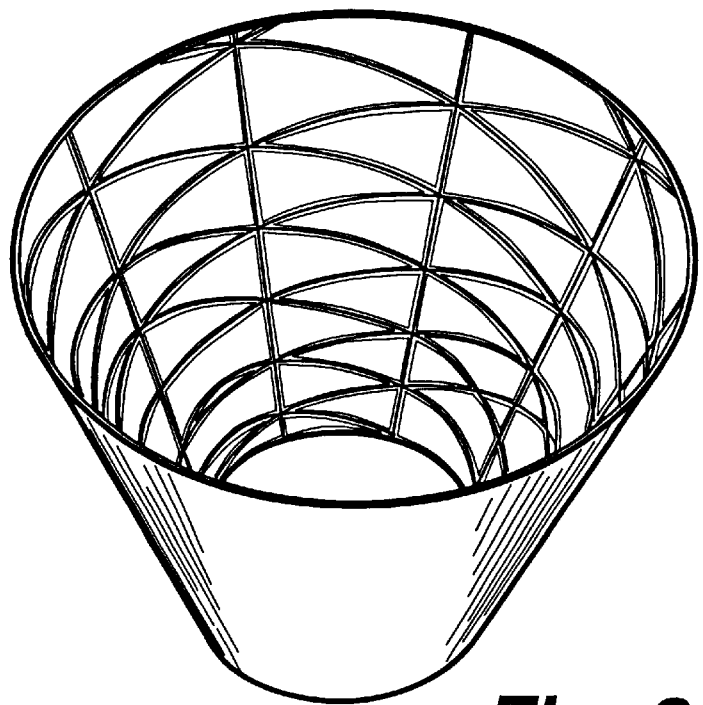

Base tooling:

The general geometry of the AGS part, see FIGS. 7 and 8, for example, is determined by the base tool 10 which must provide thermal/structural stability, part accuracy and skin release. The material selected for the base tool 10 must be thermally stable (low CTE and thermally predictable), machinable and lightweight. In the majority of cases, the base tool 10 defines the shape of the AGS structure and has machined grooves 12 which hold the expansion tool 14. Some materials that may be selected for the base tool 10 are: particle board, tooling foam, tooling epoxy, aluminum and graphite.

The base tooling materials have been evaluated as part of the hybrid tooling process. The following list is a catalog of each potential base tooling material and the determined strengths and weaknesses.

Particle Board:

Particle Board is the cheapest available base tool material. Disadvantages include some warping during cure (limits but doesn't preclude reusability of the tool) and slower machining requirements.

Tooling Foam:

Tooling Foam provides for a relatively lightweight base tool that is highly machinable. Disadvantages include cracking and compressive failures during the cure cycle leading to non-reusable tooling:

Tooling Epoxy:

Tooling Epoxy is highly machinable and very thermally stable, providing for a high quality, reusable tool. Disadvantages include moderately high cost, high weight and low glass transition temperature. To date, Tooling Epoxy has been the most successful base tool material discovered.

Aluminum:

Aluminum is highly predictable and fully reusable. Disadvantages include high cost, high weight and very slow (relative) machining requirements.

Graphite:

Graphite is the most stable tooling material available leading to very high tolerance parts. The main disadvantage of graphite tooling is the high associated cost.

Expansion tooling:

The expansion tool 14 is primarily responsible for lateral compaction of the AGS ribs. The material selected for the expansion tool 14 must have a high CTE and provide good part release. The expansion tool 14 is typically a fairly thin layer of silicon rubber resting in grooves 12 at the node intersections 20 in the base tool 10 that correspond to the locations of the AGS ribs. To date, only silicon rubber (AirTech AirCast 3700) has been successfully used for expansion tooling.

In order to achieve high quality parts using the hybrid tooling process, careful attention must be paid to sizing of the expansion tool (wall thickness, groove width, groove depth) and the base tool (groove depth). When performing this sizing, minimization of imprinting must be considered. Imprinting is an undesired side effect of hybrid tooling process where the expansion tool causes impressions on the outside of the AGS structure skin. Additionally, the tooling must be sized so that the desired rib dimensions are achieved and so that the expansion tool provides enough lateral pressure so as to fully compact the ribs. In order to predict and control these issues, a theory is developed below.

Figure 3:
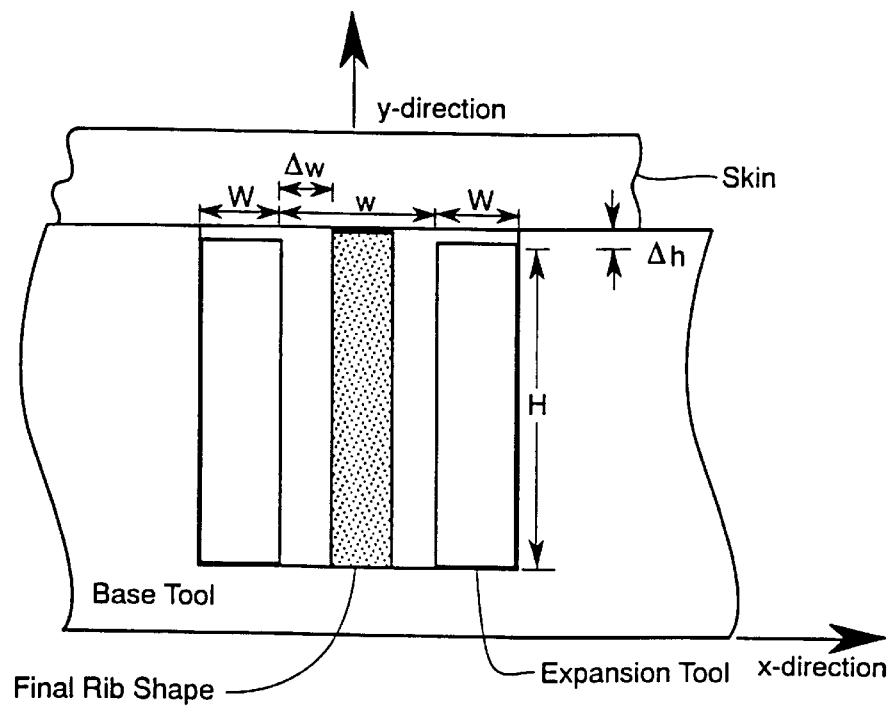
FIG. 3 is a cross section of a thermal model having a channel therein.

A good intuition into the behavior of the expansion tool can be gained from a closed form, plane strain solution. In this simple solution, the effect of the expansion tool floor is not considered. The simplified situation is shown in FIG. 3. Neglecting the effect of the expansion tool floor, there will be no shear deformation in the expansion tool and the constitutive Equations will be $$\begin{bmatrix} \varepsilon_x \\ \varepsilon_y \\ \varepsilon_z \end{bmatrix} = \frac{1}{E} \begin{bmatrix} 1 & -v & -v \\ -v & 1 & -v \\ -v & -v & 1 \end{bmatrix} \begin{bmatrix} \sigma_x \\ \sigma_y \\ \sigma_z \end{bmatrix} + \alpha \Delta T \begin{bmatrix} 1 \\ 1 \\ 1 \end{bmatrix} \qquad 1$$

where $\epsilon_i$ are the total strains in the i-direction, $\sigma_i$ are the stresses in the i-direction, E, v, α are the Young's Modulus, Poisson's Ratio, Coefficient of Thermal Expansion of the expansion tool and $\Delta T$ is change in temperature of the system. Solving for the plane strain condition yields $$\varepsilon_x = \frac{1+v}{E}((1-v)\sigma_x - v\sigma_y + E\alpha\Delta T) \qquad 2a$$

$$\varepsilon_y = \frac{1+v}{E}(-v\sigma_x + (1-v)\sigma_y + E\alpha\Delta T) \qquad 2b$$

where all strain in the z-direction has been set to zero.

Assuming that during the cure cycle the resin in the rib is in liquid form and that the expansion tool groove is sufficiently full of material to eliminated any membrane effect in the skin, the pressure on the top (y-direction) of the expansion tool and the uncured resin are both equal to the pressure being applied to the whole system. Due to the hydrostatic nature of liquids, the pressure applied laterally (x-direction) to the expansion tool is, therefore, also equal to the applied pressure. Therefore, $$\sigma_x = : -\sigma \quad (3)$$

$$\varepsilon_x = \varepsilon_y = \varepsilon$$

where σ is the applied pressure and ε is the hydrostatic strain in the expansion tool. The resulting constitutive Equation and its inverse are $$\varepsilon = \frac{1+\upsilon}{E}((2\upsilon-1)\sigma + E\alpha\Delta T) \quad (4)$$

$$\sigma = \frac{E}{2\upsilon-1}\left(\frac{\varepsilon}{1+\upsilon} - \alpha\Delta T\right)$$

where the hydrostatic strain in the expansion tool can be written as $$\varepsilon = \frac{\Delta h}{H} = \frac{\Delta w}{W} \quad (5)$$

where all symbols in Equation 5 are defined in FIG. 3.

Using the model developed above, it is possible to determine the expansion tool geometry by assuming that the hydrostatic strain is determined by material curing requirements (applied pressure and cure temperature) and that the groove width (w) is determined by the desired rib geometry. An additional constraint, that the groove width must be equal to or wider than the prepreg tow width, is necessary to facilitate winding. The desired rib width and rib height can be related to the expansion tool geometry parameters through $$R_h = H - \Delta h \quad (6)$$

$$R_w = w - 2\Delta w \quad (7)$$

where $R_h$ and $R_w$ are the desired rib height and width respectively. Typically, for maximum flexibility, the groove width, w, is set to its minimum possible value, the width of the prepreg tow. Considering w to be known, therefore, Equations 5, 6 and 7 can be solved for the remaining expansion tool geometry parameters yielding $$H = \frac{Rh}{1+\varepsilon} \quad (8)$$

$$\Delta h = H\varepsilon \quad (9)$$

$$W = \frac{w - R_w}{2\varepsilon} \quad (10)$$

$$\Delta w = W\varepsilon \quad (11)$$

where ε is a known parameter calculated by Equation 4.

Determining Tow Requirements.

Finally, it is necessary to calculate the number of tows required to obtain the desired rib geometry. The number of pre-preg tows required is $$T_n = \frac{R_w R_h}{T_A} \quad (12)$$

where $T_A$ is the area of a single tow. Alternatively, substituting Equations 6, 7, 9 and 11 yields $$T_n = \frac{H(w - 2W\varepsilon)(1+\varepsilon)}{T_A} \quad (13)$$

which must be satisfied in order to validate the assumption that there is no membrane effect in the skin, the requirement for the simplification in Equation 3.

Experimental Verification

Theory Comparison to Experimental Results.

The model noted above relates to the expansion tool geometry to required cure cycle parameters and rib geometry. To validate the model, several expansion tool configurations were studied at several applied pressures. In each case, the required number of tows was calculated using Equation 13. Verification of the model was determined by comparing the experimentally achieved rib dimensions with those predicted by Equations 6 and 7.

Figure 4:
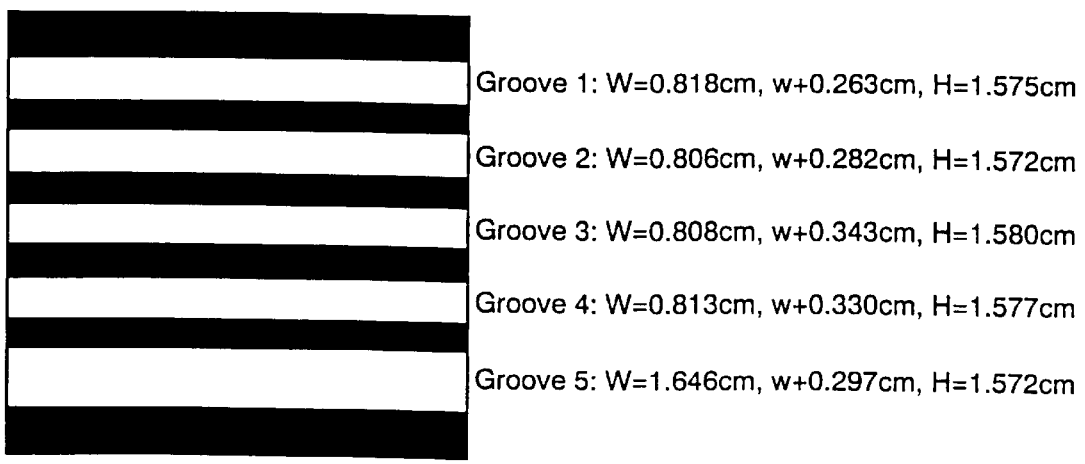
FIG. 4 is an illustration of an experimental setup having different groove configurations.

The experimental setup is shown in FIG. 4. No skin was used so that the achieved rib height could be accurately determined. For each expansion tool configuration tested, the predicted number of tows, $T_n$, was laid up-into the tool. The applied pressure was varied from 207 to 620 KPa between different runs. The material used was IM7/977-2 and the cure temperature, driven by the manufacture's recommended material cure cycle, was 177° C. for all cases.

Figure 5:
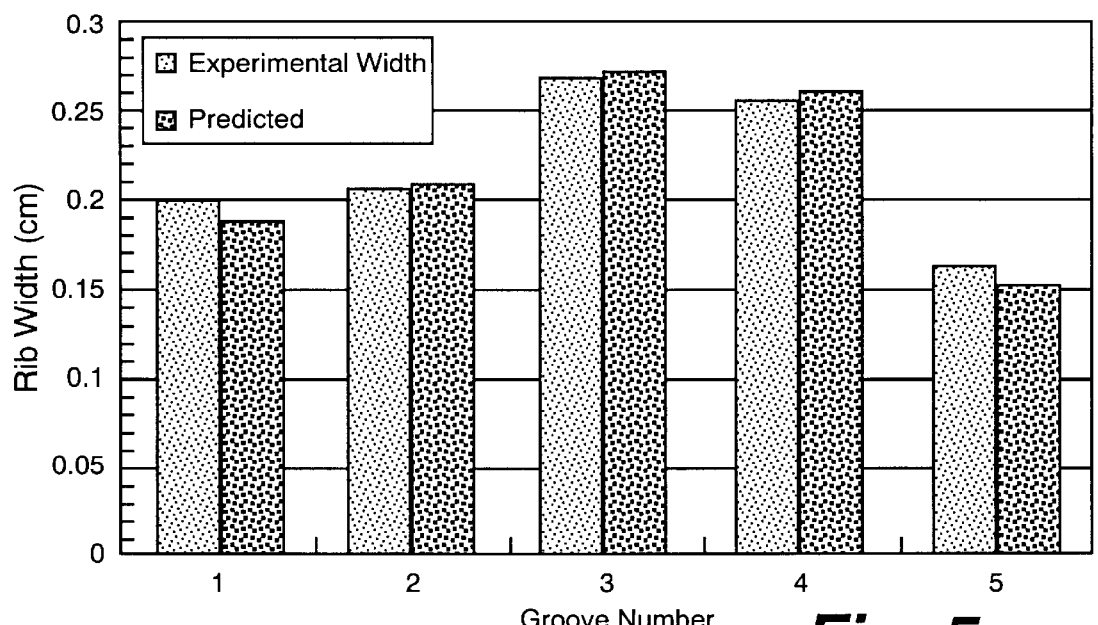
FIG. 5 compares rib width between experimental and predicted values.
Figure 6:
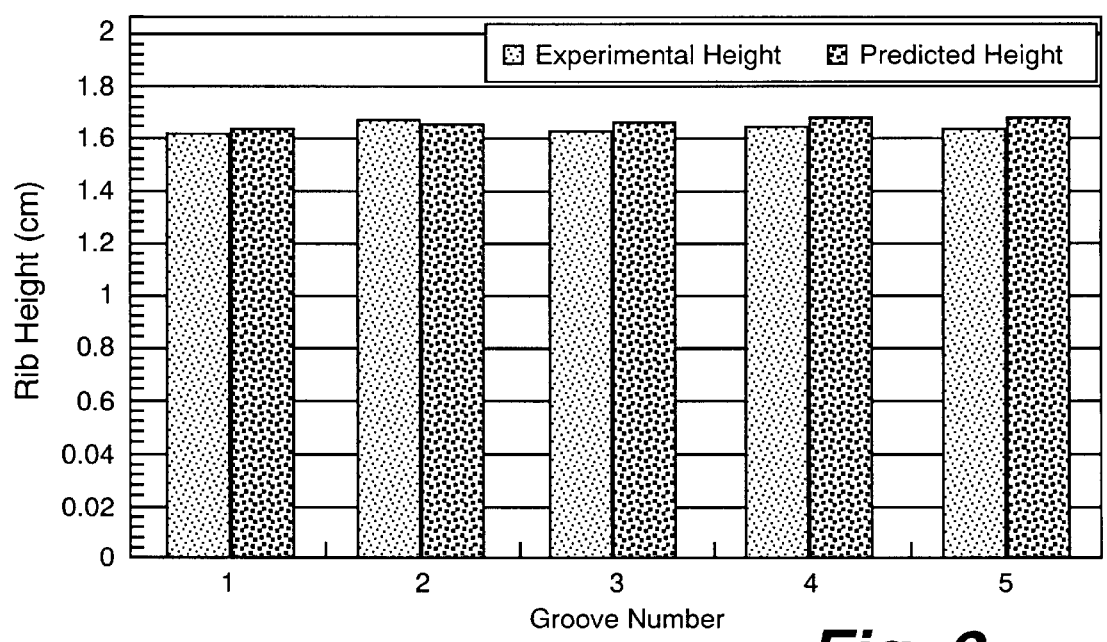
FIG. 6 compares rib height between experimental and predicted values.

All results of the experiments were in good agreement with the model. The results obtained at 620 KPa applied pressure are shown in FIGS. 5 and 6. The actual experimental rib heights and widths are shown compared to those predicted by the theory. Very good agreement is shown in all cases. The largest error was in the prediction of the rib width in Groove 5. The predicted rib width in this case differed from the experimental rib width by 6% of the experimental rib width.

Figure 9:
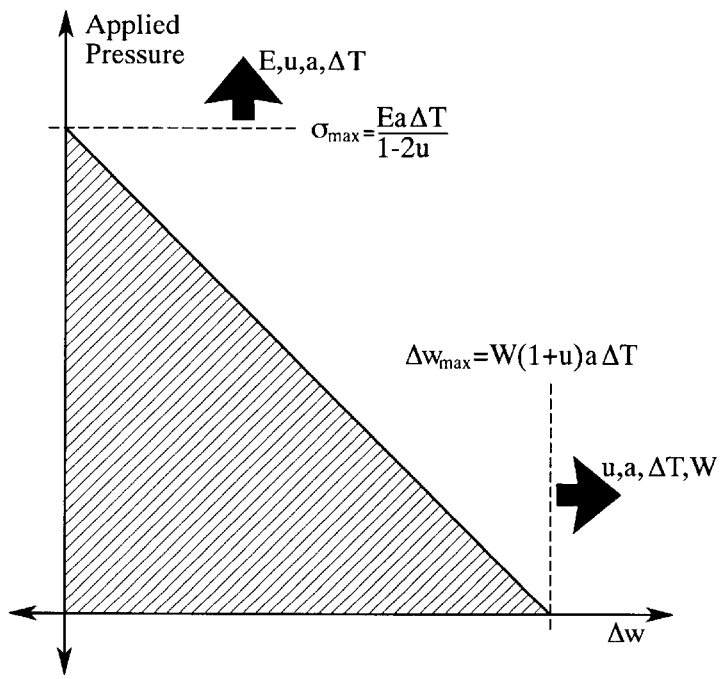
FIG. 9 illustrates possible variables in the hybrid tooling process.

Based on the above, there are implications on the process envelope within which the hybrid tooling process concept can be applied. Composite curing techniques imply that the pressure applied to the tooling during cure must be some value greater than zero. Because of the hydrostatic nature of the strain in the expansion tool, this condition implies an upper limit on the amount that the expansion tool can compress the rib. In reality, compaction of the AGS structure skin mandates a minimum applied pressure that will be greater than zero so the possible groove closure of the expansion tool will be even further limited. Substituting Equation 5 into Equation 4, the maximum possible groove closure can be calculated as $$\Delta w_{max} = W(1+\upsilon)\alpha\Delta T$$

where the applied pressure has been set to zero. Similarly, the maximum applied pressure is limited by the fact that the, AGS rib requires that the expansion tool provide some compaction. This value can be calculated using Equation 4 and is $$\sigma_{max} = \frac{E\alpha\Delta T}{1-2\upsilon} \quad (15)$$

where the strain in the expansion tool has been set to zero. These two limiting cases define a process envelope which is shown in FIG. 6. For a given hybrid tooling process case, values for the applied pressure and required compaction must be selected such that they fall inside this envelope. See FIG. 9.

Application of Hybrid tooling process to Launch Vehicle Structures. In addition to several flat and cylindrical AGS parts, a section of a launch vehicle shroud has been fabricated. The base tool was machined on a filament winder and the expansion tool, cast separately, was laid into machined grooves. The filament winder was then used to wind ribs and skin for the structure. With exception of the laying of the expansion tool, this entire process proved to be fully automated and the resulting tooling proved to be reusable. Pictures of the constructed tooling, along with the resulting part, are shown in FIGS. 7 and 8.

Using this process, a full-scale launch vehicle part, such as a moderately sized shroud, can be constructed in 35–40. hours. This number includes an autoclave cycle and fabrication of an associated tooling. Additional parts can then be wound, bagged and cured in 20–25 hours, each a large savings over traditional fabrication methods.

The advantages of this hybrid tooling lie primarily in the areas of flexibility and low cost. The base tool is made of an easily machinable material and can be easily created to exact specifications. The expansion tooling channels can be cast in one size and easily trimmed to fit onto cylindrical, flat, or conical sections without additional machining operations. The major disadvantage of this tooling is that the tool has proven to be reusable only for short production runs (3–4 articles). This tooling configuration is limited to cure temperatures of 350° F., and at cure temperatures of over 300° F. the expansion tooling may need replacement between every cycle depending on part finish requirements.

This tooling is excellent for use in creating parts of which only a few are required. This situation is very common in launch vehicle applications. The tooling is also excellent for manufacturing situations where parts are not fully defined until very close to the time of manufacture and for rapid prototyping operations.

EXAMPLE

Medium Expansion Blocks on Very Low CTE Base Tool

Figure 10:
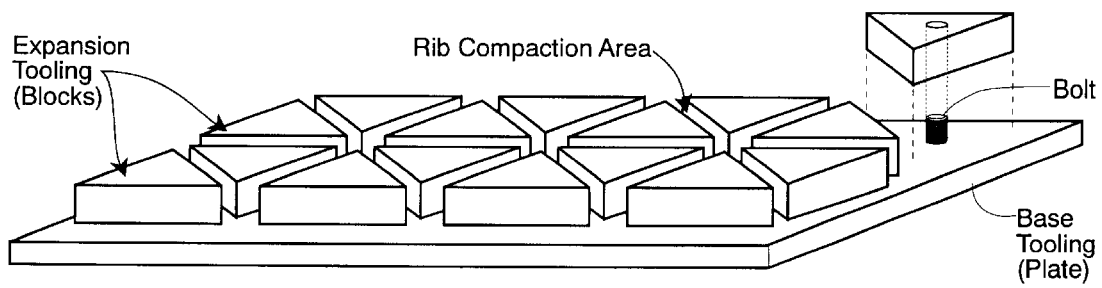
FIG. 10 illustrates another possible expansion tool and base tool.

In FIG. 10, this Hybrid tooling process implementation uses moderately high CTE polytetrafluoroethylene ("TEFLON") expansion tooling blocks attached to a thermally stable base plate, which may be composed of tooling epoxy, metallics, graphite or fiber/matrix composite. For high temperature cure cycles or large grid spacing, aluminum may be used in place of polytetrafluoroethylene ("TEFLON") for the expansion tooling blocks. The base tool and expansion tooling blocks both define the part dimensions. During the thermal cure cycle, the blocks expand to provide rib compaction. Expansion tooling of this configuration has a significantly longer pre-expansion length than the channel configuration described above. This fact allows for use of lower CTE (and more reusable, higher $T_g$) materials, such as polytetrafluoroethylene ("TEFLON"). The expansion tooling typically takes the form of triangular or rectangular blocks, that match the curvature of the base tool and can be compression molded or machined to size. The groove widths between the blocks must be carefully sized using developed theories. For flat or cylindrical applications, the blocks can be of one single shape. For conical sections, varying shaped blocks must be used.

The advantages of this Hybrid tooling process implementation over the 'High Expansion Channel In Grooved Low CTE Base tool' implementation are that this implementation is fully reusable and can generate 30–50 parts without any tooling repair or recreation. Additionally, this implementation can be used with cure cycles over 350° F., and in theory, temperatures in excess of 1000° F., which covers the cure cycles of all known resin systems. The disadvantages of this implementation, when compared to the 'High Expansion Channel In Grooved Low CTE Base tool' implementation, arise from the fact that tooling of this type is more difficult and expensive to fabricate. This initial cost (roughly double) will be offset for longer production runs.

Clearly many modifications and variations of the present invention are possible in light of the above teachings and it is therefore understood, within the inventive scope of the concept, the invention may be practiced otherwise than specifically claimed.

What is claimed is:

1. A method for making a grid-stiffened structure comprising,
   a) providing a base tool having an external surface conforming in general to a shape of said structure, said base tool having a plurality of base tool grooves therein, said grooves having openings on said external surface and providing a network of said grooves,
   b) providing an expansion tool having compaction grooves therein, for fitting into a plurality of said base tool grooves so as to define compaction grooves therein,
   c) winding a plurality of prepreg tows into said compaction grooves,
   d) placing a skin over the so-wound tows, said expansion tool and said base tool to form an assembly,
   e) bagging said assembly and
   f) autoclaving said assembly so that said expansion tool expands to provide lateral pressure to compact and shape said prepreg tows to form the prepreg tows and skin into the grid stiffened structure.

2. The method of claim 1 wherein a bag is placed over said assembly is placed in an autoclave under elevated temperature and pressure.

3. The method of claim 1 wherein said skin is wrapped about said base tool in the form of wrapped prepreg tows.

4. The method of claim 1 wherein a plurality of prepreg tows are wrapped as a skin over said base tool and over a plurality of said compaction grooves and the prepreg tows contained therein.

5. The method of claim 1 wherein said base tool is made of a material selected from the group consisting of particle board, tooling form, tooling epoxy, aluminum, graphite and fiber/matrix composite.

6. The method of claim 5 wherein said expansion tool is made of silicon rubber.

7. The method of claim 1 wherein processing variables E, $\upsilon$, $\alpha$, $\sigma$, $\Delta T$ and W are selected so that the processing conditions fall within an area defined by an applied pressure axis, $\sigma$, a groove closure distance, $\Delta w$ and a sloping line defined by $-\sigma_{MAX}/\Delta w_{MAX}$;
   where $\sigma_{MAX}=E\alpha\Delta T/(1-2\upsilon)$, $\Delta w_{MAX}=W(1+\upsilon)\alpha\Delta T$, $\sigma$ is applied pressure,
   E is Young's Modulus; $\Delta T$ is a change in system temperature, $\upsilon$ is Poisson's Ratio; $\alpha$ is the coefficient of thermal expansion of the expansion tool, and W is a base tool groove width.

8. The method of claim 1 employed in making grid-stiffened structure selected from the group consisting of shrouds, panels and covers, said structures having a network of ribs thereon that are formed in said compaction grooves.

* * * * *